United States Patent [19]

Yamada et al.

[11] 4,401,328
[45] Aug. 30, 1983

[54] ELECTRICALLY OPERATED FISHLINE TIER

[75] Inventors: Kenichi Yamada, Katano; Seiji Yokogawa; Shigehiko Fujita, both of Hirakata; Kiyoshi Takenaka, Fujiidera; Koichi Tanoue, Hirakata, all of Japan

[73] Assignee: Matsushita Electric Industrial Co., Ltd., Kadoma, Japan

[21] Appl. No.: 341,150

[22] Filed: Jan. 20, 1982

[30] Foreign Application Priority Data

| Jan. 26, 1981 [JP] | Japan | 56-10664 |
| Jan. 26, 1981 [JP] | Japan | 56-10666 |
| Jan. 26, 1981 [JP] | Japan | 56-10667 |
| Apr. 14, 1981 [JP] | Japan | 56-54168[U] |
| Jul. 9, 1981 [JP] | Japan | 56-108083 |

[51] Int. Cl.³ .................................. A01D 59/04
[52] U.S. Cl. ...................................... 289/2; 289/17; 289/18.1
[58] Field of Search ........................... 289/2, 17, 18.1

[56] References Cited

U.S. PATENT DOCUMENTS

| 1,390,103 | 9/1921 | Eanes | 289/2 |
| 1,450,941 | 4/1923 | Colman | 289/17 X |
| 2,865,665 | 12/1958 | Messa | 289/17 |
| 3,166,346 | 1/1965 | Gotz | 289/2 |
| 3,667,790 | 6/1972 | Taylor et al. | 289/17 |
| 3,734,285 | 5/1973 | Messa | 289/2 |
| 3,923,588 | 12/1975 | Warthen | 289/18.1 X |
| 4,030,743 | 6/1977 | Warthen | 289/18.1 |

FOREIGN PATENT DOCUMENTS 1172193  6/1964  Fed. Rep. of Germany ........ 289/17

*Primary Examiner*—Louis Rimrodt
*Attorney, Agent, or Firm*—Wenderoth, Lind & Ponack

[57] ABSTRACT

An electrically operated, hand-held tier for tying a length of fishline to a fishhook comprises a tying wheel mounted rotatably on a bearing boss for rotation in one direction. The tying wheel has an anchoring member secured thereto for holding releaseably one end portion of the fishline after the fishline has been passed through the bearing boss. One end of a fishhook opposite to its sharp point is adapted to be received in coaxial relation to the bearing boss and has a number of turns of the fishline formed thereon when the tying wheel is rotated several times thereabout. The rotation of the tying wheel is effective to form a knot on the fishline which is necessary to secure the fishhook to the fishline.

11 Claims, 32 Drawing Figures

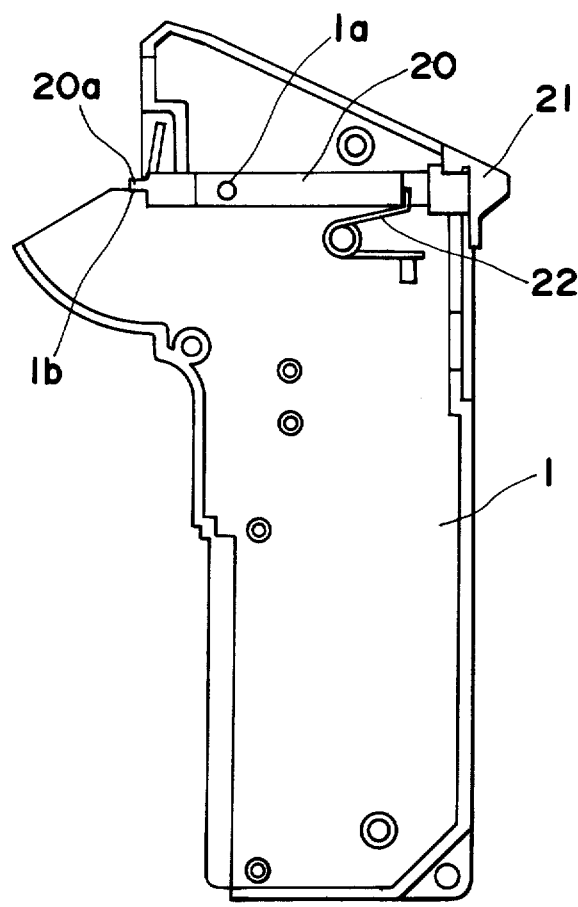
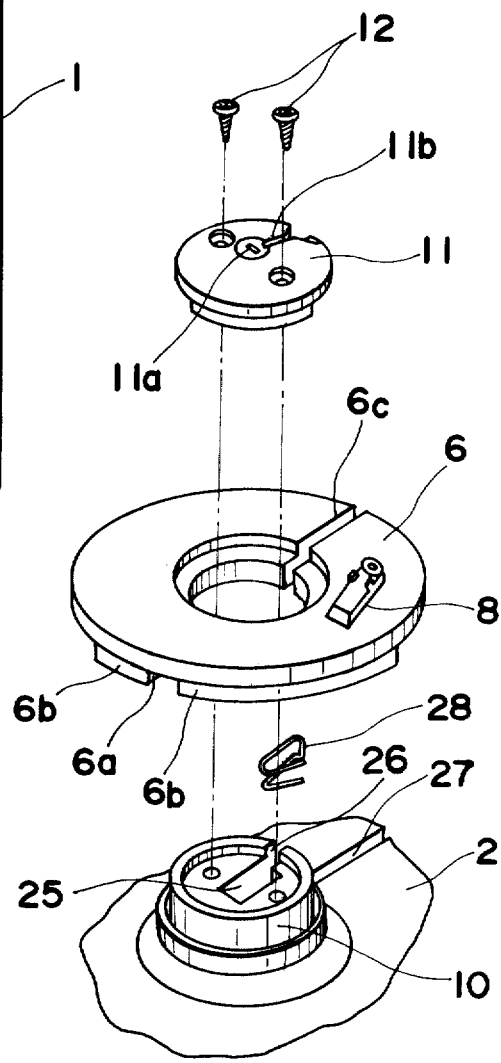

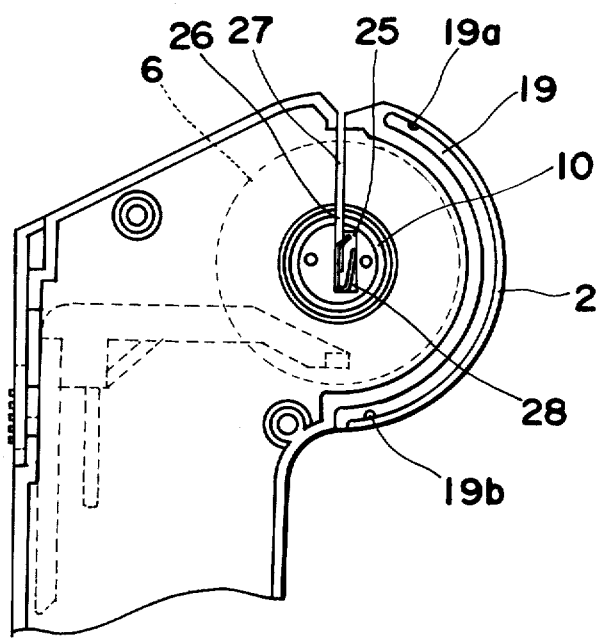
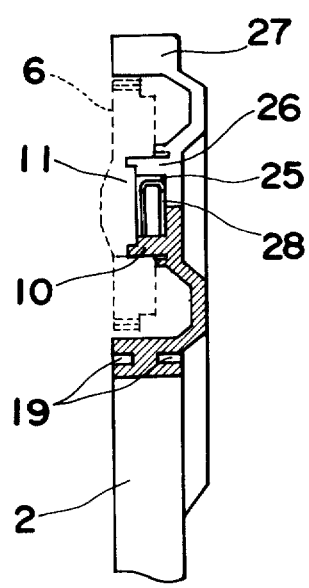
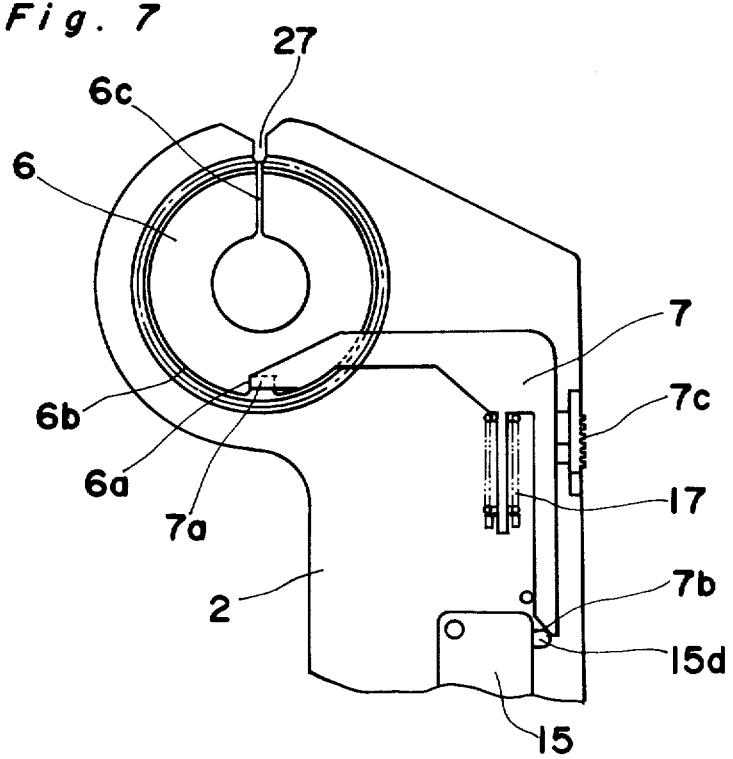

ELECTRICALLY OPERATED FISHLINE TIER

The present invention generally relates to an electrically operated tier and, more particularly, to an electrically operated, hand-held tier for tying a fishhook to a length of fishline.

Hitherto, tying of a fishhook to a length of fishline has been carried out either manually or by the use of a manually operated fishline tier. Whetherever it is done manually or by the use of the manually operated fishline tier, it requires sophisticated skills and this is particularly true where the fishhook is relatively small and the fishline to be tied with the fishhook is very fine. Even with the manually operated fishline tier, a difficulty has been encountered in manipulating the machine.

In view of the above, less experienced amateur fishermen as well as laymen are often forced to feel difficulty in making a knot necessary to secure the fishhook to the fishline, and a difficulty has long been encountered in that a desired fishline cannot be tied to a desired fishhook.

Accordingly, the present invention has been developed with a view to substantially eliminating these disadvantages and inconveniences inherent in the prior art tier and has for its essential object to provide an electrically operated fishline tier with with even laymen as well as those who are not good at a fine hand work and those who are short-sighted can make a knot necessary to secure the fishhook to the fishline.

Another important object of the present invention is to provide an electrically operated fishline tier of the type referred to above, which is handy in structure and reliable in operation.

To this end, the present invention provides an electrically operated tier which comprises a generally elongated, flattened housing having a bearing boss and a first guide slit means defined therein, said first guide slit means extending exteriorly of the housing and terminaring at a position spaced the maximum possible distance from the longitudinal axis of the bearing boss; a drive motor housed in the housing; a tying wheel rotatably mounted on the bearing boss with a portion thereof exposed to the outside of the housing, said tying wheel having one annular end face formed with an annular projection protruding therefrom in coaxial relation thereto and also having a second guide slit means defined therein, said second guide slit means extending in a radial direction completely across the tying wheel, said annular projection having a detent recess defined therein; a transmission means housed in the housing for transmitting a drive of the motor to the tying wheel to rotate the tying wheel in one direction; an anchoring member rigidly mounted on the other annular end face of the tying wheel for rotation together therewith, said anchoring member being adapted to releaseably hold a free end portion of the length of fishline once it has been connected thereto; means secured to the bearing boss on one side laterally of the other annular end face of the tying wheel for releaseably supporting one end of the fishhook, opposite to its sharp point, in coaxial relation to the longitudinal axis of the bearing boss; a manipulatable switching lever supported in the housing for movement between operative and inoperative positions and having a pawl element formed therein, said pawl element being, when and so long as the switching lever is in the inoperative position, engaged in the detent recess to hold the tying wheel at a stop position whereat the second guide slit means is registered with the first guide slit means in side-by-side relation to permit the passage of a portion of the fishline through both of the first and second guide slit means in a direction radially inwardly of the tying wheel so as to traverse from one side of the tying wheel to the other side thereof across and generally coaxially of the bearing boss, said anchoring member being exposed to the outside of the housing when and so long as the tying wheel is held in the stop position; a power supply control switch operatively associated with the switching lever for, when turned on in response to the movement of the switching lever from the inoperative position to the operative position with the pawl element consequently disengaged from the detent recess, completing a power supply circuit from a source of electrical power to the drive motor to energize the latter, said switch being turned off in response to the return movement of the switching lever towards the inoperative position; and a biasing means for urging the switching lever to the inoperative position.

According to the present invention, with the electrically operated tier of the construction described above, what an operator of the tier is required to do is simply to wind a length of fishline in a specified manner around the tying wheel after a fishhook has been set to the tier with one end received in coaxial relation to the bearing boss and then to turn the switch on to permit the tying wheel to rotate. During the rotation of the tying wheel, a portion of the fishline is turned around the end of the fishhook and, therefore, it is preferred to let the tying wheel undergo a predetermined number of rotations, for example, five rotations or so.

As the electrical power source, any commercially available battery, preferably a single 1.5 volt, AM-3 battery, will serve the purpose. Accordingly, the machine according to the present invention is compact in structure and handy, giving a pleasant appearance to fishermen either less experienced or experienced.

BRIEF DESCRIPTION OF THE DRAWINGS

These and other objects and features of the present invention will become apparent from the following description taken in conjunction with a preferred embodiment thereof with reference to the accompanying drawings, in which:

FIG. 3 is a side elevational view of a cover plate for the tier, showing a fishhook retainer carried thereby;

FIG. 4 is an exploded view showing a fishline tying wheel assembly and a fishline retainer employed in the tier;

FIG. 5 is a side elevational view of a portion of a casing for the tier, showing the fishline retainer;

FIG. 6 is a front sectional view of that portion of the casing shown in FIG. 5;

FIG. 7 is a side elevational view of a portion of the cover plate, showing a manipulatable switching lever used in the tier;

DETAILED DESCRIPTION OF THE EMBODIMENT

Figure 1:
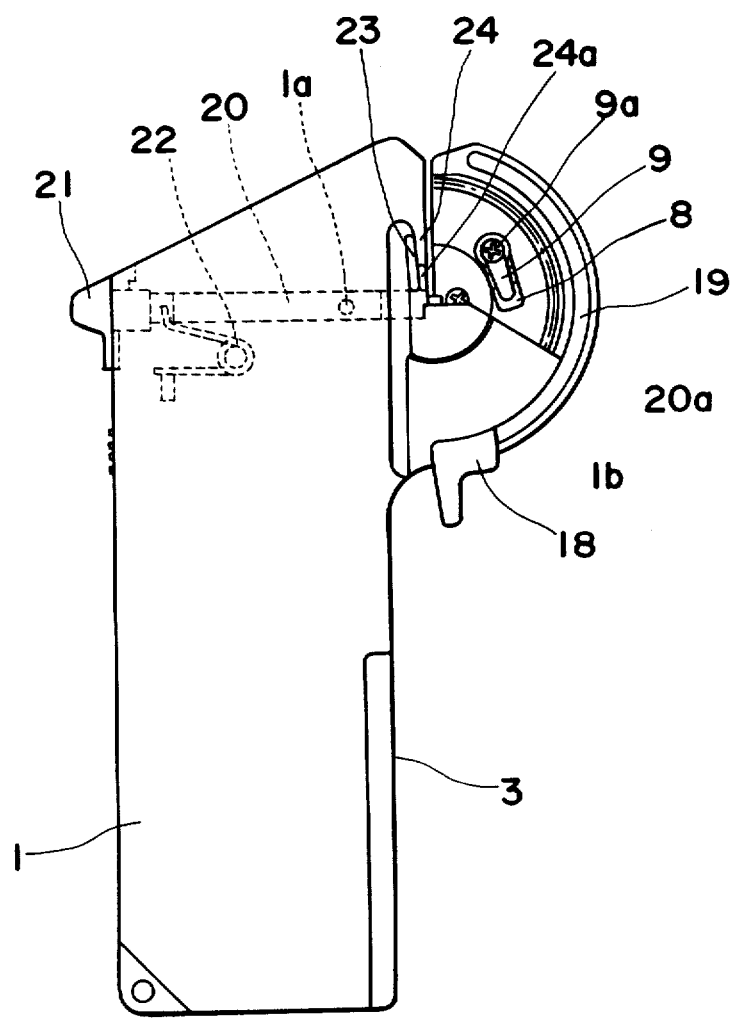
FIG. 1 is a side elevational view of an electrically operated tier according to the present invention.

Before the description of the present invention proceeds, it is to be noted that like parts are designated by like reference numerals throughout the accompanying drawings.

Referring first to FIGS. 1 to 10, an electrically operated tier according to the present invention comprises a generally elongated casing 2 having a cover plate 1 removably fitted to the casing 2. The casing has a battery chamber defined at 3 and accommodates therein a drive motor 4 at a substantially intermediate portion thereof, which motor 4 may be rigidly mounted in the casing 2. The drive motor 4 has a drive shaft 4a on which a worm gear 5 is pressure fitted for rotation together therewith.

Figure 8:
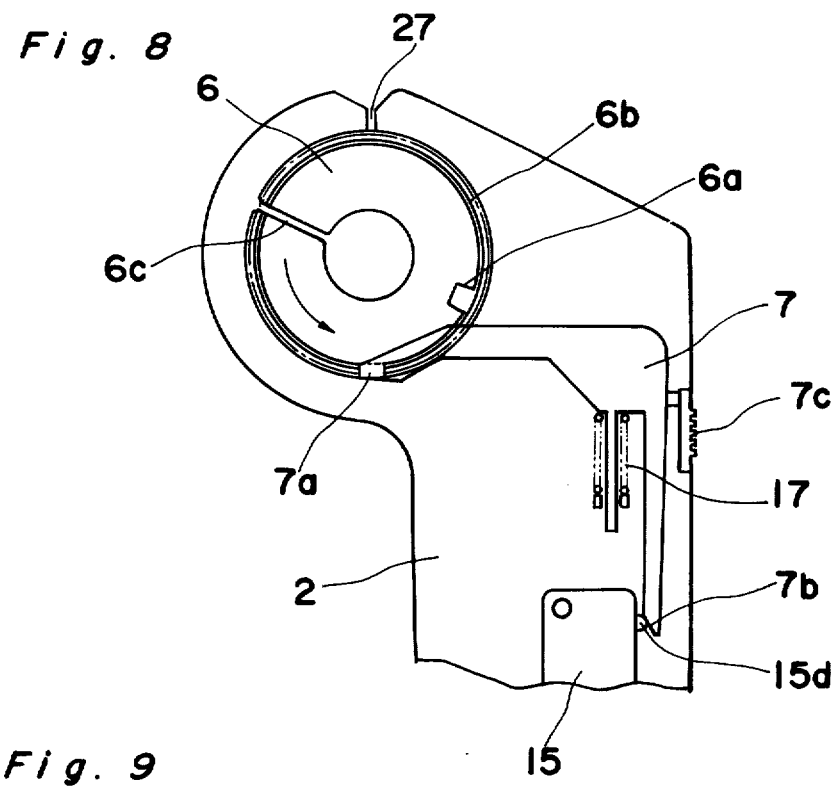
FIG. 8 is a view similar to FIG. 7, showing the switching lever in a different operative position.
Figure 9:
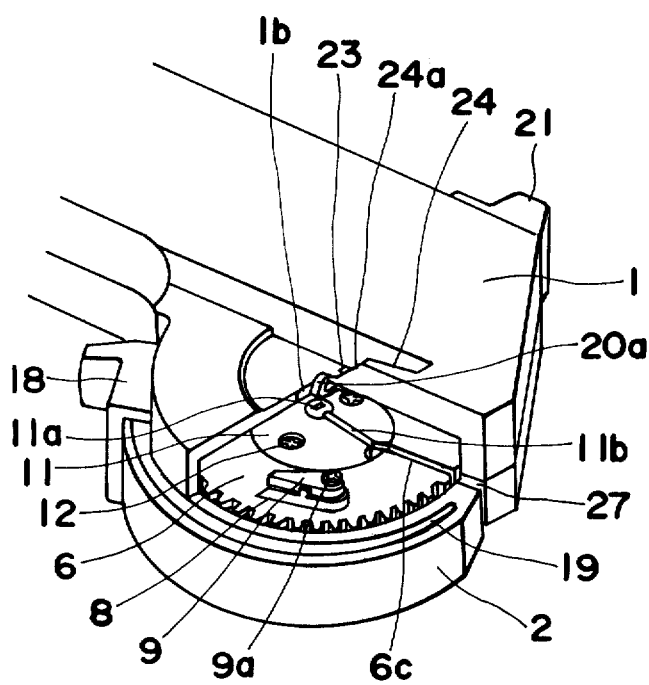
FIG. 9 is a perspective view of an essential portion of the tier shown in FIG. 1, the tier being shown in horizontally laid position.

The tier also comprises a tying wheel 6 of generally split-ring shape having its outer periphery formed with gears adapted to mesh with the worm gear 5 and also having a radially extending guide slit 6c defined therein. As best shown in FIGS. 4, 7 and 8, one end face of the tying wheel assembly 6 has an annular projection 6b protruding outwardly therefrom in coaxial relation thereto, said annular projection 6b having a detent recess 6a which is defined therein so as to extend radially inwardly from the outer peripheral face thereof. This detent recess 6a is engageable with a pawl 7a integral with a manipulatable switching lever 7 as will be described later.

The opposite end face of the tying wheel assembly 6 has a platform 8 protruding laterally outwardly therefrom in a direction opposite to the annular projection 6b and carries an anchoring member 9 riveted at 9a to the platform 8. The anchoring member 9 is preferably made of a generally U-shaped leaf spring and is used for the anchoring of one end of a fishline or fishing cord thereto. This anchoring member 9 may be made of a rubber block so far as it has a slit effective to retain that one end of the fishline.

Figure 2:
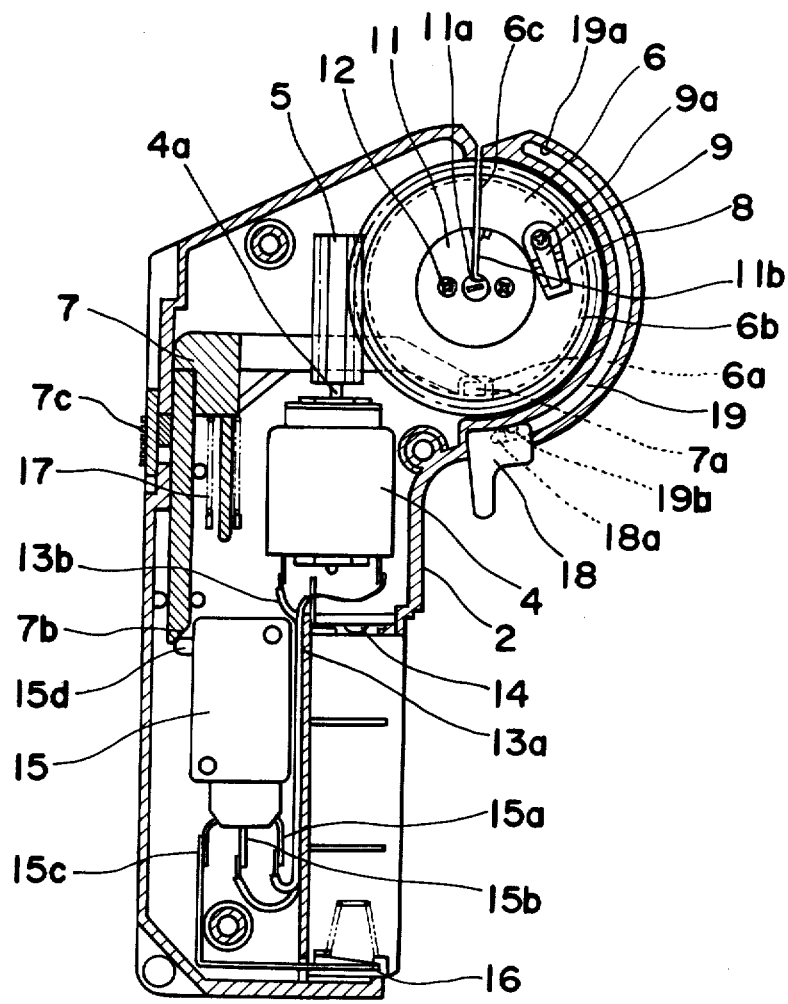
FIG. 2 is a side sectional view of the tier shown in FIG. 1.

The tying wheel assembly 6 is, as best shown in FIG. 4, rotatably mounted on a bearing boss 10 formed integrally with the casing 2 so as to protrude into the interior of the casing 2, said bearing boss 10 having a diameter substantially equal to the inner diameter of the tying wheel assembly 6. The bearing boss 10 projects coaxially through the wheel assembly 6 with its free end face having a retainer disc 11 which is secured thereto by means of set screws 12, such that the wheel assembly 6 will not separate from the bearing boss 10 unless the retainer disc 11 is removed. As best shown in FIGS. 2 and 4, the retainer disc 11 has a receptacle 11a defined therein at the center thereof for receiving one end 29a of a fishhook 29 (FIG. 17) opposite to its barbed point 29b, and also has a guide slit 11b defined therein so as to extend radially inwardly from its periphery and terminating a slight distance spaced from the receptacle 11a. It is to be noted that the retainer disc 11 is so secured to the bearing boss 10 by means of the set screws 12 that, when and so long as the drive motor 4 is brought to a halt, the guide slit 6c in the wheel assembly 6 and the guide slit 11b in the retainer disc 11 are aligned with each other as best shown in FIG. 2.

Figure 18:
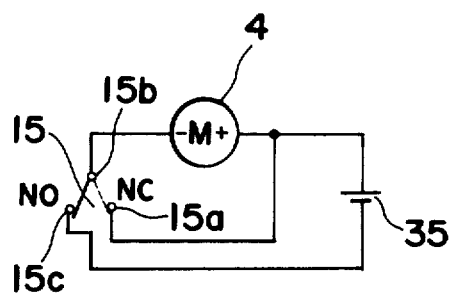
FIG. 18 illustrates an electrical circuit for a drive motor which may be used in the tier according to the present invention.
Figure 20:
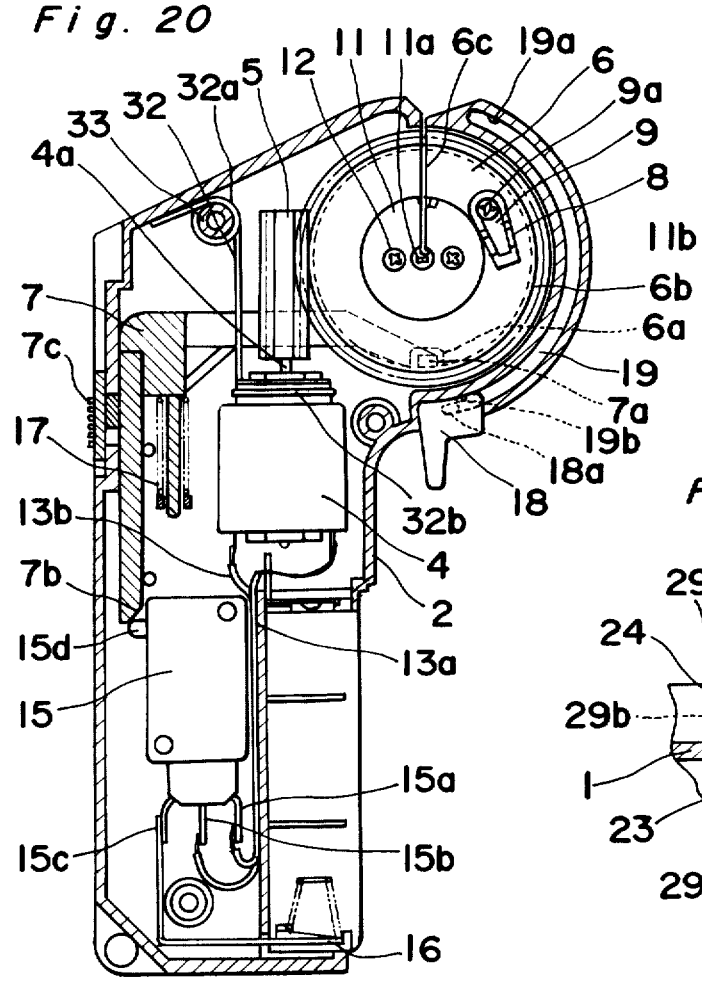
FIG. 20 is a view similar to FIG. 2, showing a modification made to the preferred embodiment of the present invention.

The drive motor 4, which may be a D.C. micromotor, has positive and negative input terminals, the positive input terminal being connected by means of a lead wire 13a to a positive terminal member 14 facing the battery chamber 3 and also to a NC terminal 15a of a microswitch 15 whereas the negative input terminal is connected to a common terminal 15b of the microswitch 15 through a lead wire 13b. The microswitch 15 has a further terminal, i.e., a NO terminal 15c connected through a lead wire to a negative terminal member 16 which faces the battery chamber 3 in opposed relation to the positive terminal member 14 and which may be in the form of a coiled wire. This wiring circuit is best shown in FIG. 18 and will be described in detail later. However, it is to be noted that, in contrast to the microswitch shown as having the three terminals, a microswitch having two terminals may be employed. In the case of the microswitch having the two terminals, they should be connected to the positive input terminal of the micromotor and the positive terminal member 14 while the negative terminal member 16 is connected to the negative input terminal of the micromotor. However, the employment of the microswitch of the illustrated type and, hence, of the wiring system shown in FIG. 18 is preferred because of the reason which will become clear from the subsequent description.

As best shown in FIGS. 2, 7 and 8, the manipulatable switching lever 7 is of a generally L-shaped configuration having one arm carrying the pawl 7a at its free end and another arm extending generally at right angles to said one arm and having a slope defined at 7b. The slope 7b at the free end of said other arm of the switching lever 7 is so shaped and so positioned that, when the switching lever 7 is shifted from an off position, shown in FIG. 7, to an on position shown in FIG. 8 by the application of an external sliding force to a slide knob 7c integral with the switching lever 7, an actuating element 15d of the microswitch 15 is inwardly collapsed to switch the microswitch 15 on. It is to be noted that, simultaneously with the movement of the switching lever 7 from the off position towards the on position, the pawl 7a is disengaged from the detent recess 6a in the annular projection 6b fast with the tying wheel assembly 6 to permit the wheel assembly 6 to be driven in one direction at the time the microswitch 15 is turned on. A driving force necessary to rotate the wheel assembly 6 is transmitted from the motor 4 through the engagement between the worm gear 5 and the gears on the outer periphery of the wheel assembly 6.

It is to be noted that, since the switching lever 7 is normally biased to the off position by the action of a biasing spring 17, for example, a compression spring so far shown, the microswitch 15 is turned on and, therefore, the motor 4 is driven to rotate the wheel assembly 6 so long as the external sliding force is applied to the slide knob 7c. Release of the external sliding force from the slide knob 7c results in deenergization of the motor 4, it being, however, to be noted that the actuating element 15d of the microswitch 15 is kept depressed in contact with the slope 7b until the detent recess 6b in the annular projection 6a being rotated together with the wheel assembly 6 is brought into alignment with the pawl 7a. Therefore, unless the once rotated wheel assembly 6 completes its 360° rotation about the longitudinal axis of the bearing boss 10, the microswitch 15 is kept turned on in contact with the slope 7b and, therefore, the motor 4 is kept in energized condition. Complete return of the switching lever 7 to the off position after it has been moved to the on position takes place, not upon release of the external sliding force from the slide knob 7c, but upon engagement of the pawl 7a into the detent recess 6b.

Figure 29:
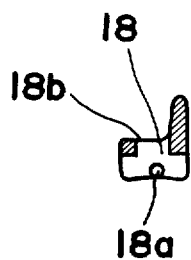
FIG. 29 is a side sectional view of the slider.
Figure 30:
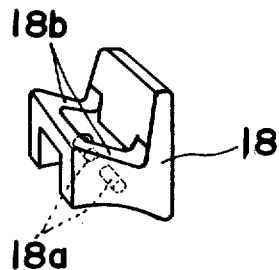
FIG. 30 is a perspective view, on a somehwat enlarged scale, of the slider.

The casing 2 carries a slider 18 movable between receiving and transfer positions along an arcuate path externally along and partially following the outer periphery of the wheel assembly 6. More specifically, the casing 2 has a curved wall encircling substantially halfway the outer periphery of the wheel assembly 6 and having its opposite lateral side faces formed with respective arcuate guide grooves 19. On the other hand, the slider 18 has a pair of bearing pins 18a, as best shown in FIGS. 29 and 30, extending in the opposite directions close towards each other and is mounted on the casing 2 with said bearing pins 18a movably engaged in the respective arcuate guide grooves 19. One wall portion defining the respective arcuate guide groove 19 is formed with a pair of detent projections 19a and 19b so spaced that the slider 18 can be clicked to occupy the receiving and transfer positions one at a time. In other words, once the slider 18 is moved from the receiving position to the transfer position, the slider 18 is held firmly in the transfer position with the bearing pins 18a trapped by the respective detent projections 19a. Similarly, the slider 18 can be held firmly in the receiving position with the bearing pins 18a trapped by the respective detent projections 19b once it has been moved back to the receiving position.

Figure 19:
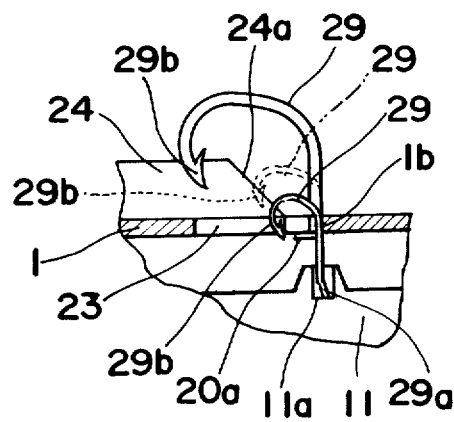
FIG. 19 is a front elevational view, on a somewhat enlarged scale, showing the capability of accommodating fishhooks of different sizes, the tier being shown as horizontally laid position.
Figure 21:
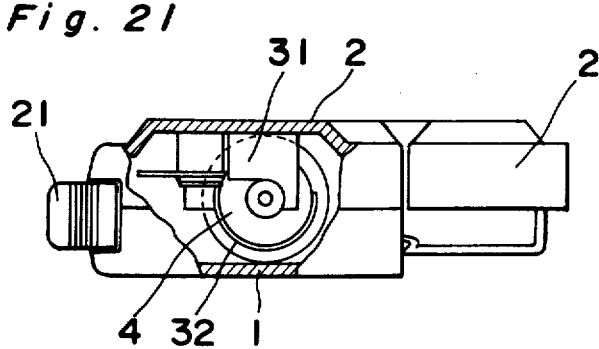
FIG. 21 is a top sectional view of the tier shown in FIG. 20.

As best shown in FIGS. 1, 3 and 19, the cover plate 1 carries a fishhook holder for holding the fishhook 29 firmly in position during the tying operation. This fishhook holder comprises a pivotable lever 20 which has one end receiving a knob 21 pressure fitted thereto and the other end formed into a generally V-shaped finger 20a. A portion of the pivotable lever 20 adjacent the finger 20a is supported on a bearing pin 1a, fast and integral with the cover plate 1, for pivotal movement between retained and release positions about such bearing pin 1a. This pivotable lever 20 is normally biased to assume the retained position by the action of a biasing spring 22, for example, a V-shaped wire spring so far illustrated, or any other spring element such as a leaf spring. When the pivotable lever 20 is in the retained position as biased by the spring 22, the finger 20a is in contact with a support table 1b defined in the cover plate 1.

The cover plate 1 has a slot defined at 23, leaving a rib 24 on an outer side portion of the cover plate 1 adjacent the wheel assembly 6, said rib having an outwardly tapered end 24a terminating in continuance with a portion thereof adjacent the support table 1b. The function of the rib 24 will be described later.

As best shown in FIGS. 4, 5 and 6, the bearing boss 10 fast and integral with the casing 2 has a generally rectangular socket 25 defined therein for the accommodation of a fishline retainer 28 therein. This rectangular socket 25 is continued to a guide slit 27, defined in the casing 2 so as to extend in parallel to the longitudinal axis of the casing 2, through a guide slit 26 defined in a wall portion of the bearing boss 10. The guide slit 27 defined in the casing 2 has a length larger than the sum of the respective lengths of the guide slit 6c in the wheel assembly 6 and the guide slit 11b in the retainer disc 11 and is so designed that, when and so long as the wheel assembly 6 is in a stop position with the guide slit 6c aligned with both of the guide slit 11b in the retainer disc 11 and the guide slit 27 in the casing 2, a length of fishline 20 (FIG. 17) can be inserted and passed so as to extend across the wheel assembly 6 in substantially coaxial relation to the longitudinal axis of the bearing boss 10, it being, however, to be noted that, in view of the presence of the receptacle 11a in the retainer disc 11 at the center thereof, the length of fishline 30 so inserted and so passed extends at a position offset the slightest possible distance from the longitudinal axis of the bearing boss 10 or from the receptacle 11a.

The fishline retainer 28 accommodated within the rectangular socket 25 is, so far illustrated, in the form of a generally U-shaped wire spring and is used to retain a portion of the length of fishline 30, which passes through the guide slit 11b in the retainer disc 11 and the guide slit 27 in the casing 2, in position in cooperation with a wall portion defining the rectangular socket 25. This retainer 28 is confined within the socket 25 with no possible separation thereof out of the socket 25 because of the retainer disc 11 secured to the bearing boss 10 as hereinbefore described. It is to be noted that this retainer 28 may not be always necessary and, in the case where it is not employed, the rectangular socket 25 may also be omitted. It is also to be noted that, instead of the wire spring, a leaf spring may be employed for the fishline retainer 28.

Figure 10:
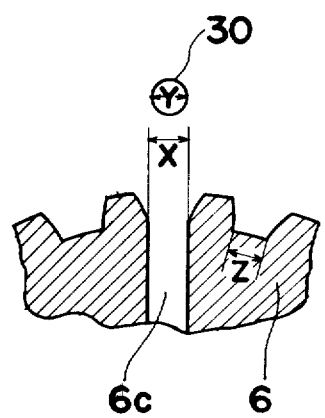
FIG. 10 is a side sectional view, on an enlarged scale, of a portion of a fishline tying wheel used in the tier.

The guide slits 6c, 11b and 27 have an equal width which is slightly greater than the maximum possible diameter Y (FIG. 10) of the fishline 30. In particular, not only is the width X of the guide slit 6c slightly greater than the maximum possible diameter Y of the fishline 30, but also the gears on the outer periphery of the wheel assembly 6 should be so selected that the bottom of the dale between each adjacent two gears has a width Z equal to the width X of the guide slit 6c as best shown in FIG. 10. By so selecting, a smooth engagement between the gears on the outer periphery of the wheel assembly 6 and the worm gear 5 can be ensured even in the presence of the guide slit 6c in the wheel assembly 6.

Hereinafter, the operation of the electrically operated tier of the construction so far described will be described with particular reference to FIGS. 11 to 19.

Figure 11:
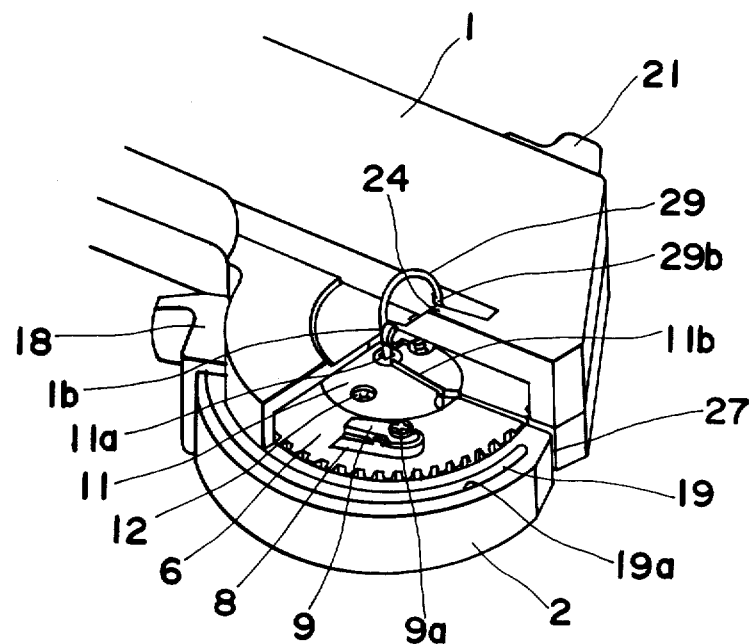
FIGS. 11 to 16 are views each similar to FIG. 9, showing the sequence of fishline tying.

The first thing for an amateur fisherman or an operator to do is to set the fishhook 29 in the tier. For this purpose, the operator of the tier according to the present invention should press the knob 21 so as to cause the pivotable lever 20 to pivot from the retained position towards the release position against the biasing spring 22 with the finger 20a consequently separating away from the supporttable 1b integral with the cover plate 1. Then, while the knob 21 is kept pressed, the operator mounts the fishhook 29 with the free end 29a thereof inserted into the receptacle 11a and, thereafter, the external pressing force is released from the knob 21 to allow the pivotable lever 20 to return to the retained position by the action of the biasing spring 22. After this procedure has completed, the fishhook 29 is firmly retained by the tier in such a manner that the stem of the fishhook 29 is clamped between the V-shaped finger 20a of the pivotable lever 20 and the support table 1b on the cover plate 1 while the point 29b is loosely received and guarded in the slot 23 in the cover plate 1, as best shown in FIGS. 11 and 19. It is to be noted that, in FIG. 19, the fishhook 29 is shown in three types of different sizes, small, medium and large, and, in the case of the large fishhook 29, the point 29b is, when the fishhook 29 is so retained as hereinbefore described, held in contact with the rib 24 without being inserted into the slot 23.

Figure 12:
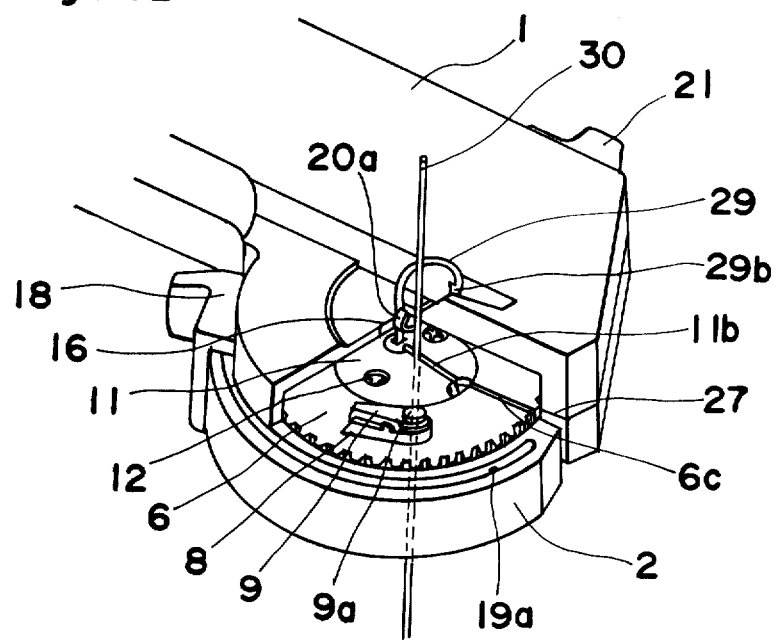
Figure 13:
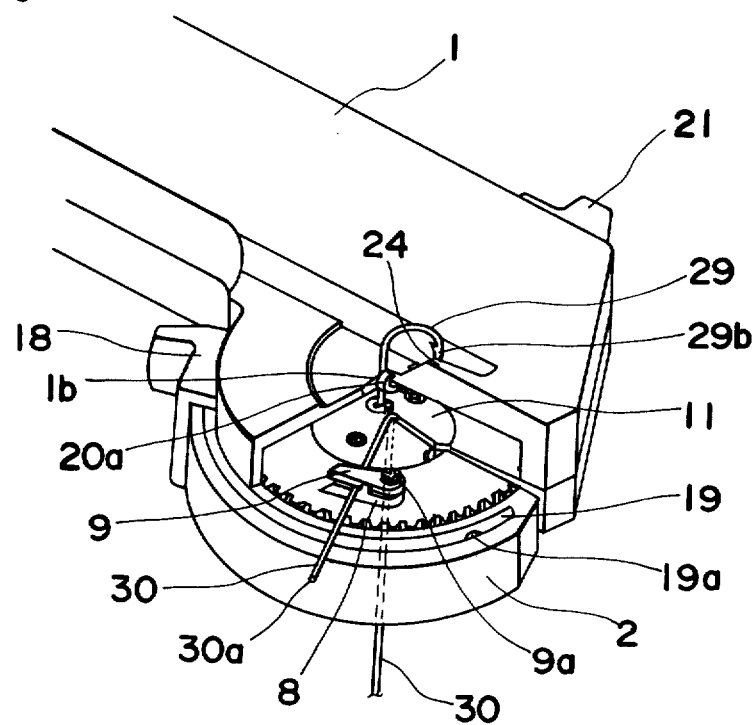

Subsequently, a length of fishline 30 extending from a reel (not shown) is wound around the wheel assembly 6 in the manner which will now be described. As best shown in FIG. 12, the length of fishline 30 is laid through the guide slits 27, 6c, 11b and 26, which are all aligned with one another when and so long as the wheel assembly 6 is in the stop position, so as to pass across the wheel assembly 6 substantially coaxially with the center of rotation of the wheel assembly 6 or the bearing boss 10. A free end portion of the length of fishline 30 opposite to the reel (not shown) from which it extends outwards is located on one side of the tier adjacent the anchoring member 9 and is anchored to the anchoring member 9 in the form as sandwiched between the anchoring member 9 and the platform 8 as clearly shown in FIG. 13. It is to be noted that, when to anchor the free end portion of the length of fishline 30 in the manner described above, care is required to anchor to the anchoring member 9 a portion of the fishline 30 spaced a certain distance, say, 1 to 3 cm, inwardly from the free end extremity 30a thereof depending on the diameter of the stem of the fishhook 29 and the number of turns desired to be made.

Figure 14:
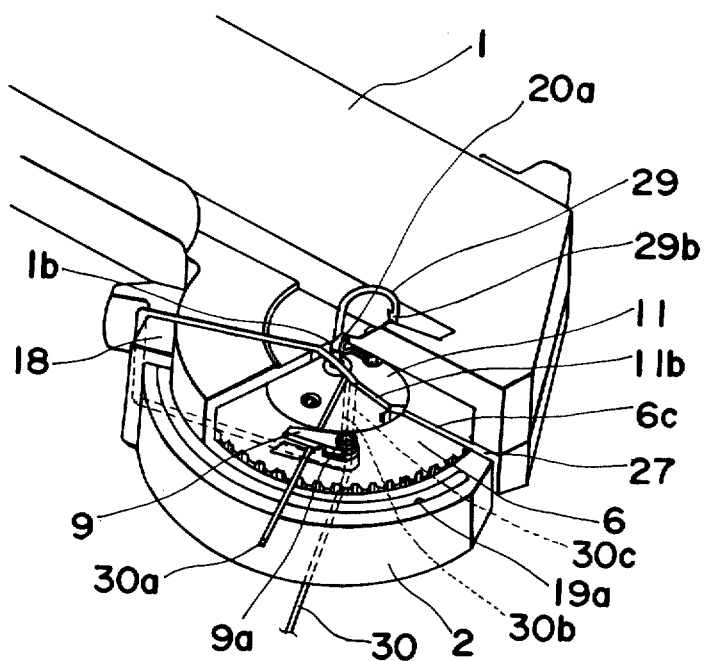

Thereafter, as shown in FIG. 14, that portion of the fishline 30 on one side adjacent the reel is turned around the slider 18 in the receiving position and is then laid under pressure through the guide slits 27, 6c, 11b and 26 to pass again across the wheel assembly 6 substantially coaxially with the center of rotation of the wheel assembly 6 or the bearing boss 10. Thus, it will readily be seen that different portions 30b and 30c of the length of fishline 30 are retained in position within the socket 25 in the bearing boss 11 by the fishline retainer 28 in overlapping relation to each other as shown by the broken lines in FIG. 14. Because of the retaining force exerted by the fishline retainer 28, the portion of the fishline 30 which is turned around the slider 18 in the receiving position will not be loosened or slackened even when and after an external pulling force applied during the winding of the length of fishline 30 has been released from the portion of the fishline 30 adjacent the reel which extends outwards from the tier on one side of the wheel assembly 6 opposite to the free end portion thereof. By the manner described above, the length of fishline 30 is completely set to the electrically operated tier preparatory to the formation of a knot necessary to secure the length of fishline 30 to the fishhook 29.

It is to be noted that, when the portion of the fishline 30 is turned around the slider 18, it passes over the slider 18 in contact with a support surface 18b so shaped as will be described later with particular reference to FIGS. 27 to 30.

After the setting of the length of fishline 30 to the tier has completed in the manner described above, the slide knob 7c integral with the switching lever 7 is pressed to move downwards as viewed in FIGS. 2 and 7 to allow the slope 7b on the one hand to turn the microswitch 15 on and the pawl 7a on the other hand to disengage from the detent recess 6a in the tying wheel assembly 6. Therefore, as shown in FIG. 7, the drive motor 4 is energized to drive the wheel assembly 6 in one direction about the bearing boss 10. So far shown, the wheel assembly 6 is rotated in a clockwise direction as viewed in FIGS. 1 and 2 about the bearing boss 10 although it may be in a counterclockwise direction. Once the wheel assembly 6 is rotated from its stop position with the pawl 7a disengaged from the detent recess 6a, the switching lever 7 is held in the on position against the biasing spring 17 even though the external sliding force applied to the slide knob 7c to move the latter downwards has been released therefrom. As hereinbefore described, it is when the pawl 7a fast with the switching lever 7 is engaged into the detent recess 6a that the switching lever 7 is returned to the off position as biased by the biasing spring 17 with the microswitch 15 consequently turned off to deenergize the motor 4.

As the wheel assembly 6 is rotated about the bearing boss 10, the free end portion of the fishline 30 extending outwardly from the guide slit 11b and resiliently retained by the anchoring member 9 is turned around a portion of the stem of the fishhook 29 adjacent the end 29a. Therefore, after several, say, four or five, turns of the fishline 30 has been made around the stem portion of the fishhook 29, the external sliding force applied to the slide knob 7c to move the switching lever 7 to the on position is released therefrom to allow the switching lever 7 to return to the original off position. The complete return of the switching lever 7 to the off position when the five or six turns of the fishline 30 has been formed on the stem portion of the fishhook 29.

In other words, the slide knob 7c is kept moved downwards as viewed in FIGS. 1 and 2 by the application of the external sliding force before the wheel assembly 6 completes five or six rotations about the bearing boss 11 and the external sliding force is released from the knob 7c after the wheel assembly 6 being rotated enters the fifth or sixth rotation. At the time of completion of the fifth or sixth rotation of the wheel assembly 6, the pawl 7a is engaged into the detent recess 6a to bring the wheel assembly 6 to a halt with the switching lever 7 consequently returned to the off position as biased by the biasing spring 17. Therefore, simultaneously with the engagement of the pawl 7a into the detent recess 6a, the microswitch 15 is turned off to deenergize the motor 4.

Figure 15:
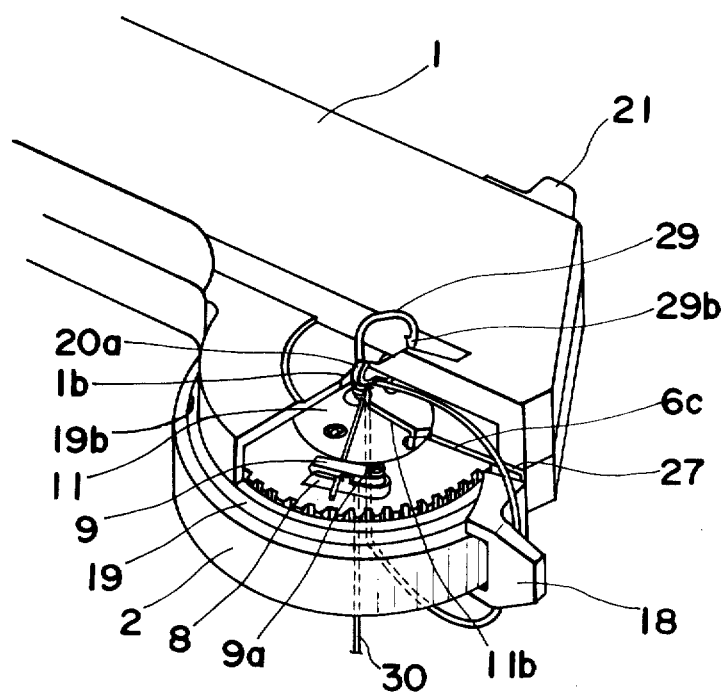
Figure 16:
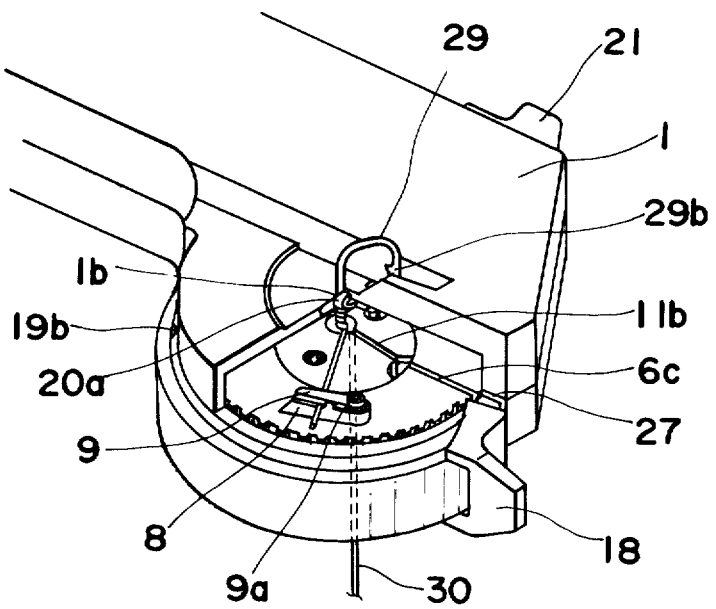
Figure 17:
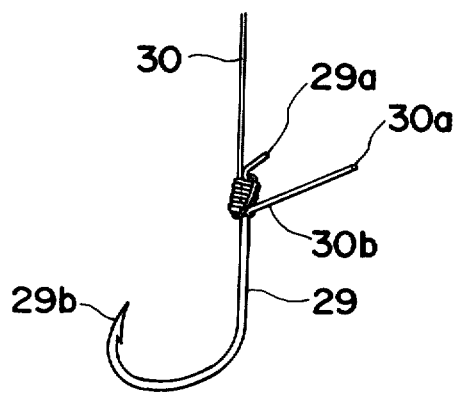
FIG. 17 is a side view, on an enlarged scale, of a fishhook showing a know formed by the tier according to the present invention.

Thereafter, the slider 18 in the receiving position is manually moved towards the transfer position along the arcuate guide grooves and is then clicked to the transfer position with the bearing pins 18a overriding the detent projections 19b. By so doing, that portion of the fishline 30 turned around the slider 18 is brought to a position ready to enter the guide slit 27 as best shown in FIG. 15. After the slider 18 has been moved to the transfer position, that portion of the fishline 30 which extends outwardly from the guide slit 27 in a direction opposite to the anchoring member 9 is pulled outwardly of the tier to allow the portion of the fishline 30 on the slider 18 to slip from the support surface 18b into the guide slit 27 and then into the guide slit 11b through the guide slit 6c as shown in FIG. 16, thereby forming a knot on the stem portion of the fishhook 29 as shown in FIG. 17. Removal of the fishhook 29 having the knot so formed can be done by pressing the knob 21 so as to cause the pivotable lever 20 to pivot from the retained position towards the release position against the biasing spring 22. The free end portion of the fishline 30 which has been retained by the anchoring member 9 and which now extends outwards from the knot whereat the fishline 30 is rigidly secured to the fishhook 29 may be severed off, thereby completing the entire tying operation.

A merit of the employment of the particular microswitch 15 in the wiring circuit for the motor 4 will now be described with reference to FIG. 18.

Referring now to FIG. 18, the microswitch 15 has been described as having the NC terminal 15a connected to the positive terminal member 14 which is also connected with a positive terminal of the motor 4, the common terminal 15b connected to a negative terminal of the motor 4, and the NO terminal 15c connected to the negative terminal member 16. In this circuit, when the switching lever 7 is moved to the on position against the biasing spring 17 in the manner as hereinbefore described, the common terminal 15b is electrically connected to the NO terminal 15c to complete a power supply circuit to energize the motor 4. However, when the pawl 7a fast with the switching lever 7 is engaged in the detent recess 6a with the switching lever 7 having been returned to the off position by the action of the biasing spring 17, the common terminal 15b which has been connected to the NO terminal 15c is switched over to the NC terminal 15a to open the power supply circuit for the motor 4.

Even when the power supply circuit has been opened to deenergize the motor 4 in the manner described above, the motor 4 continues its rotation under the influence of an inertia force, tending to further rotate the wheel assembly 6 then held in the stop position with the detent recess 6a receiving the pawl 7a therein. However, the connection of the common terminal 15b with the NC terminal 15a results not only in the opening of the power supply circuit for the motor 4, but also in the establishment of a braking circuit with which the motor 4 rotating under the influence of the inertia force serves as a generator effective to generate a reverse voltage from the positive terminal of the motor 4 to the negative terminal of the same motor 4 to apply a braking force to the motor 4. Since this reverse voltage acts to reverse the direction of rotation of the motor 4, the undesirable inertia force can be counteracted by the tendency of the motor 4 to rotate in the reverse direction.

Therefore, it is clear that, even in the presence of the inertia force, the motor 4 can be brought to a halt with the wheel assembly 6 held definitely at the stop position. This is important in that the guide slit 6c in the wheel assembly 6 can be always registered in line with the guide slit 11b in the retainer disc 11 and also with the guide slit 27 in the casing wall.

The electrically operated tier of the construction shown in and described with reference to FIGS. 1 to 18 is satisfactory and effective in making the knot for connecting the fishline firmly to the fishhook. However, there may be the possibility that, even though the provision has been made to apply the braking force to the motor by means of the braking circuit as hereinbefore described with reference to FIG. 18, the influence of the inertia force can not be completely removed and, therefore, the motor still rotating under the influence of the inertia force would not stop at such a required position as to bring the wheel assembly 6 to a halt exactly at the stop position where the guide slit 6c in the wheel assembly is registered in line with the guide slit 11b in the retainer disc 11 and also with the guide slit 27 in the casing wall. This equally applies even where no braking circuit is used. This possibility appears to result from one or a combination of various factors including the voltage of the battery used and the load imposed by the fishline on the wheel assembly (which load varies with the thickness or diameter of the fishline used).

More specifically, assuming that the application of the external sliding force to the slide knob 7c has been released and the pawl 7a has not yet been engaged in the detent recess 6a, the worm gear 5 being driven by the motor 44 tends to override the gears on the wheel assembly 6 at the instant the pawl 7a is engaged into the detent recess 6a to bring the wheel assembly 6 to a halt. This may occur particularly when the battery for providing an electrical power to the motor 4 is fresh and has not yet been consumed so much and the fishline used is relatively fine, and results in the misalignment of the guide slits 27, 6c and 11b to such an extent that a difficulty arises in setting the length of fishline 30 to the tier and, if not impossible, the length of fishline 30 being forcibly set to the tier will receive a resistance likely to result in the formation of invisible flaws in the length of fishline 30.

Figure 22:
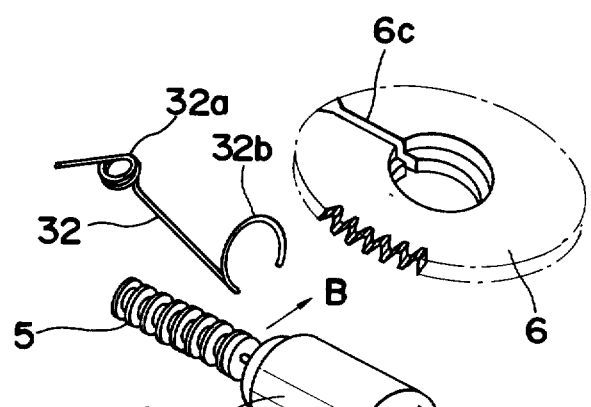
FIG. 22 is an exploded view of the drive motor, showing the manner by which it is supported.

In order to avoid the above described undesirable possibility, the motor 4 is preferably mounted on the casing 2 in a movable manner. For this purpose, referring now to FIGS. 20 to 24, the casing 2 has a pair of spaced motor supports 31 and 36 integrally formed therewith and protruding outwardly therefrom at right angles thereto, said motor support 31 being substantially L-shaped whereas the support 36 is substantially U-shaped as best shown in FIG. 22. The motor 4 is mounted on the casing 2 with its opposite ends received in the associated motor supports 31 and 36. In order to hold the motor 4 in position on the one hand and also to permit the worm gear 5 on the other hand to disengage from the gears on the wheel assembly 6 when the latter tends to override at the time of deenergization of the motor 4, a biasing spring which is in the form of a wire spring 32 is employed. This wire spring 32 has a mounting eye formed at 32a and one end 32b so shaped as to encircle or catch the body of the motor 4 and is disposed in the casing 4 with the eye 32a mounted on a support stud 33 integral with the casing 2. With the wire spring 32 so disposed, the one end 32b of the wire spring 32 is engaged to the motor 4 while the other end thereof is engaged to a side wall portion of the casing 2 so that a biasing force exerted by the wire spring 32 can be applied to the motor 4 and then to the worm gear 5 to urge the latter towards the wheel assembly 6 in a direction shown by the arrow B. It is to be noted that the motor support 31 integral with the casing 2 is so shaped as to regulate the force of contact of the worm gear 5 to the wheel assembly 6 and is, for this purpose, generally L-shaped.

In the arrangement shown in FIGS. 20 to 24, when the motor 4 is deenergized as a result of the movement of the switching lever 7 to the off position by the action of the biasing spring 17 with the pawl 7a engaged into the detent recess 6a, the motor 4 tends to further rotate under the influence of the inertia force. Since at this time the wheel assembly 6 has been locked in the stop position with the pawl 7a engaged in the dentent recess 6a as hereinbefore described, the worm gear 5 tending to override the gears on the wheel assembly 6 incident to the further rotation of the motor 4 under the influence of the inertia force disengage from the gears on the wheel assembly 6, separating away from the wheel assembly 6 against the wire spring 32 accompanied by the corresponding displacement of the motor 4 in a direction shown by the arrow A in FIG. 22. At this time the motor support 36 provides a fulcrum about which the body of the motor 4 pivots to permit the disengagement of the worm gear 5 away from the wheel assembly 6 against the wire spring 32.

Figure 23:
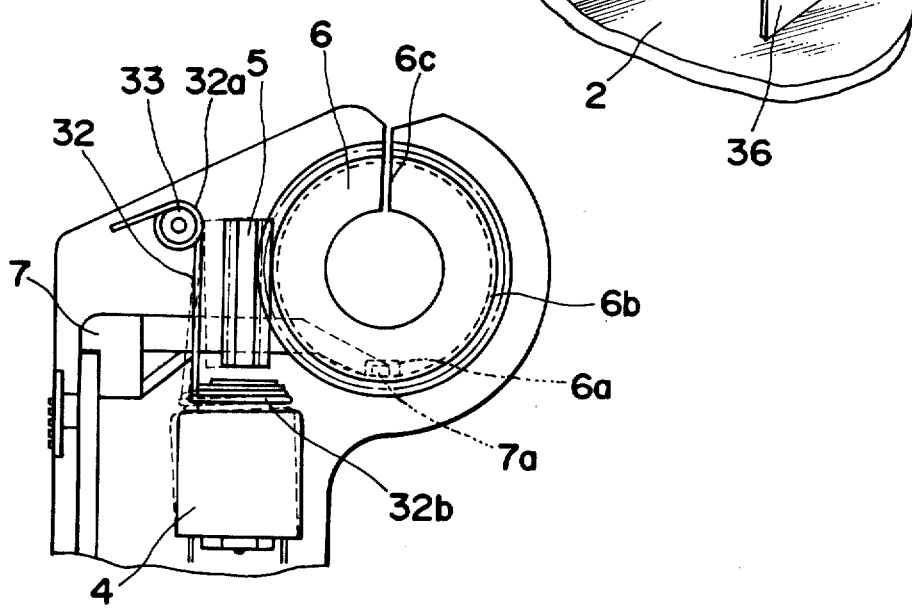
FIG. 23 is a view similar to FIG. 20, showing an essential portion of the tier shown in FIG. 20.
Figure 24:
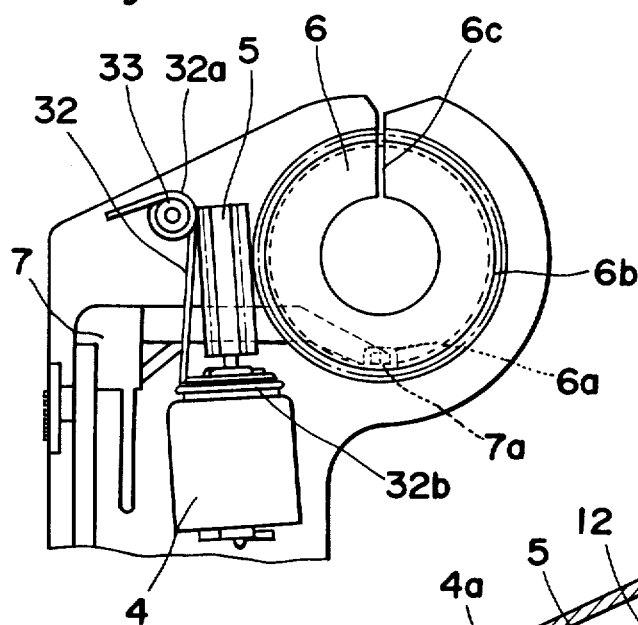
FIG. 24 is a view similar to FIG. 23, showing the drive motor displaced against a biasing wire spring.

However, at the time the motor 4 completely stops, the worm gear 5 can be returned to the original position to establish its engagement with the gears on the wheel assembly 6. More specifically, where the voltage of the battery is relatively high and the load imposed by the fishline 30 on the wheel assembly 6 is relatively small, it may occur that the worm gear 5 is temporarily disengaged from the gears on the wheel assembly 6 and is thereafter forced by the wire spring 32 to engage the gears on the wheel assembly 6 at a position one pitch displaced, substantially as shown in FIG. 23. On the other hand, where the tier has been used over a certain period of time and the voltage of the battery is, therefore, reduced to a relatively low value, it may occur that the worm gear 5 temporarily disengaged from the gears on the wheel assembly 6 is brought to a halt in a manner overriding the gears on the wheel assembly 6 as shown in FIG. 24.

Thus, the provision of the wire spring 32 rather than the fixed mounting of the motor relative to the casing 2 is advantageous in that any possible breakage of some of the gears on one or both of the worm gear 5 and the wheel assembly 6 can also be avoided. It is to be noted that, even when the condition shown in FIG. 24 is established, the worm gear 5 can be brought into engagement with the gears on the wheel assembly 6 by the action of the wire spring 32 when the motor 4 is energized during the next succeeding cycle of operation.

Figure 25:
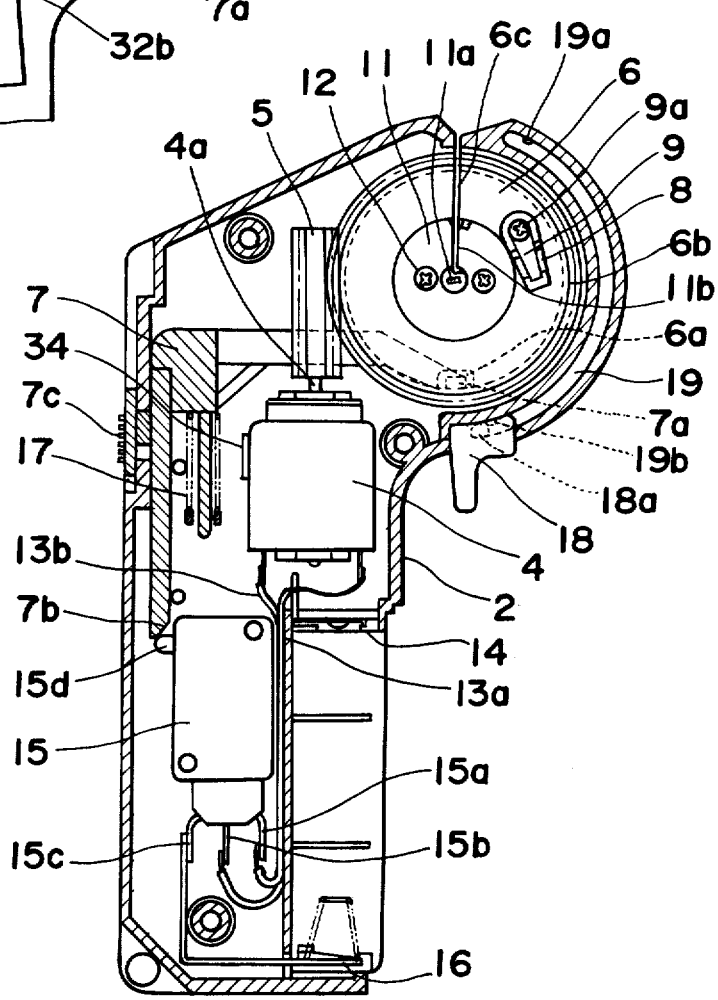
FIGS. 25 and 26 are views similar to FIGS. 20 and 21, respectively, showing another modification made to the preferred embodiment of the present invention.
Figure 26:
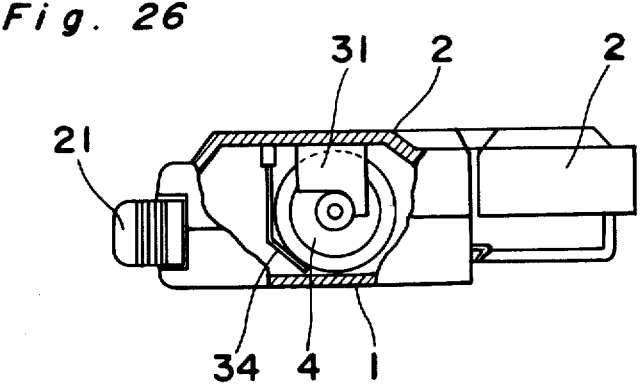

It is to be noted that, instead of the wire spring 32, a leaf spring may be employed as shown by 34 in FIGS. 25 and 26.

Figure 27:
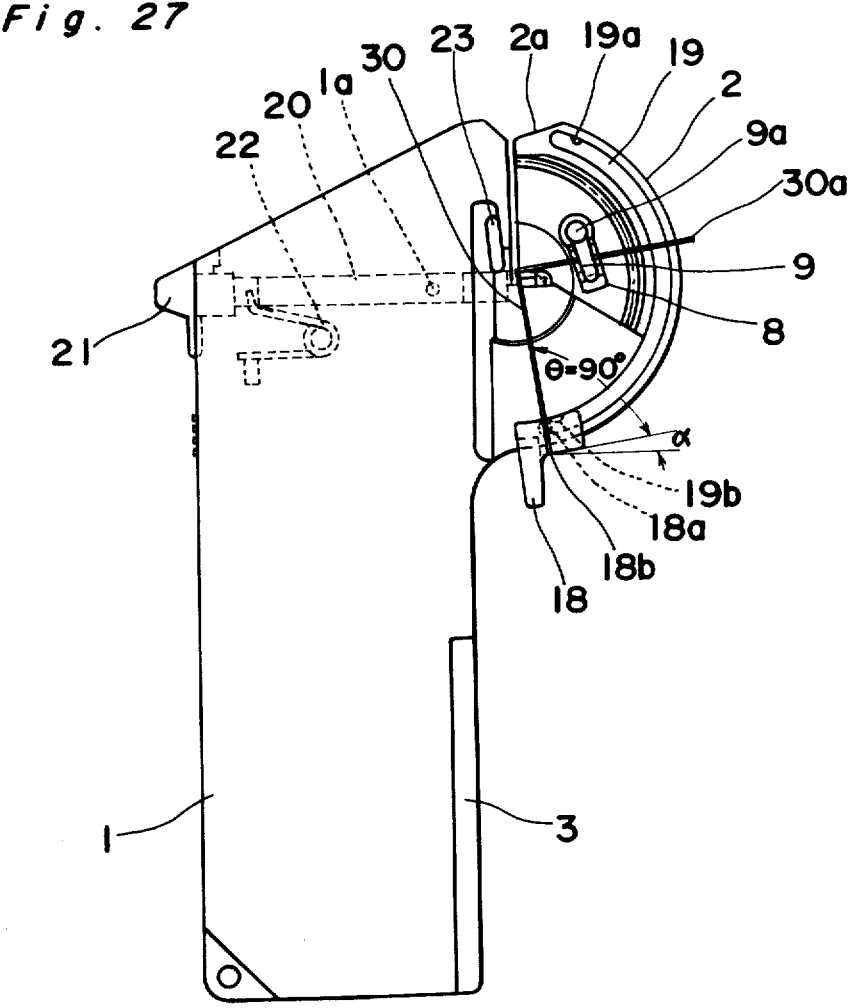
FIGS. 27 and 28 are views similar to FIGS. 1 and 2, respectively, showing the manner in which a slider used in the tier according to the present invention is designed and operated.
Figure 28:
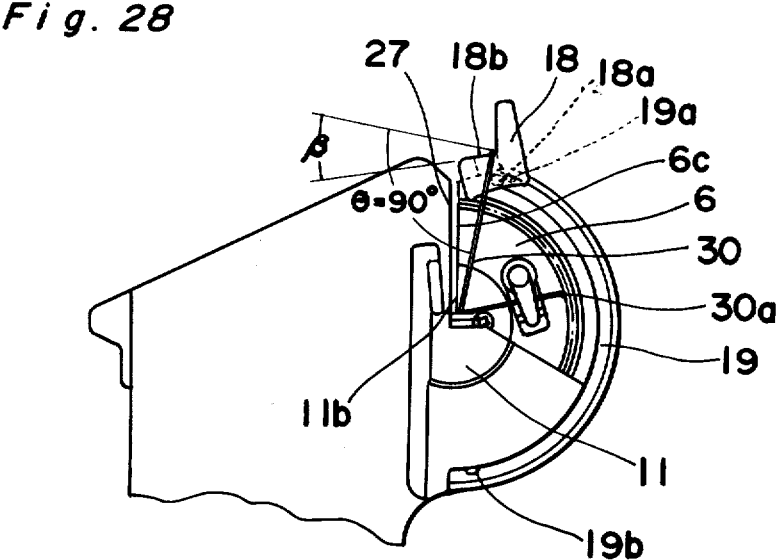

Referring to FIGS. 27 to 30, the details of the slider 18 will now be described. As best shown in FIG. 27, the slider 18 is so designed that, when it is in the receiving position, the support surface 18b which the length of fishline 30 is turned around and extends across in the manner as hereinbefore described lies in a plane at an angle greater by α than the tangential angle θ of 90°. Therefore, when that portion of fishline is turned around the slider 18 so as to extend across the support surface 18b, there is no possibility that that portion of fishline 30 may slip off the support surface 18b in a direction away from the slider 18. However, when the slider 18 has been moved to the transfer position as shown in FIG. 28 in the manner as hereinbefore described, the support surface 18b lies in a plane at an angle smaller by β than the tangential angle θ. This is because a portion of the casing wall confronting the guide slit 27 adjacent the transfer position of the slider 18 is so inclined that, when the slider 18 arrives at the transfer position, the slider 18 can pivot about the bearing pins 18a in a direction with the support surface 18b inclined downwards towards the guide slit 27 as best shown in FIG. 28. Therefore, at the transfer position of the slider 18, that portion of fishline 30 can slip off the support surface 18b onto the guide slit 27 when a slight pull is given to the portion of fishline 30 extending outwardly from the guide slit 27, thereby forming the knot on the length of fishline 30.

Although the provision of the slider 18 is advantageous in that the shift of that portion of fishline 30 turned around and encircling the assembly of the casing 2 and the wheel assembly 6 towards a position immediately above the guide slit 27 can be facilitated merely by moving the slider 18 from the receiving position towards the transfer position, it may not be essential in the practice of the present invention because such shift can be done manually without the aid of the slider.

Figure 31A:
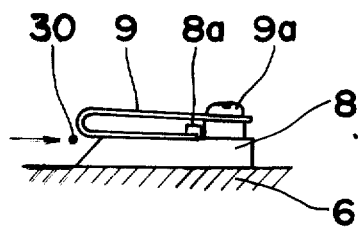
FIGS. 31(a) and 31(b) are side elevational views showing an anchor member in relation to a fishline.
Figure 31B:
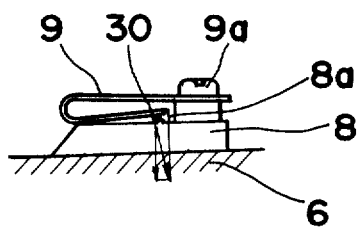

Shown in FIGS. 31(a) and 31(b) is the details of the anchoring member 9 rigidly mounted on the tying wheel assembly 6 through the platform 8 integral with such wheel assembly 6. As shown, the anchoring member 9 is in the form of a generally U-shaped leaf spring having a pair of leg portions, one leg portion having one end secured to the platform 8 by means of the rivet 9a and the other end continued to the other leg portion which extends between said one leg portion and the platform 8 and terminates at a position spaced a distance from the rivet 9a. By the action of the resiliency the anchoring member 9 has, the other leg portion thereof is urged to contact the surface of the platform 8 so that, when the free end portion of the fishline 30 is inserted in between the other leg portion of the anchoring member 9 and the platform 8, it can be gripped therebetween.

However, in order to avoid any possible disengagement of the free end portion of the fishline 30 once inserted in between the other leg portion of the anchoring member 9 and the platform 8, the platform 8 has a stopper block 8a formed integrally therewith and protruding outwards from the surface of the platform 8 at a position laterally of the free end of the other leg portion of the anchoring member 9. As best shown in FIG. 31(b), this stopper block 8a is effective to avoid any possible through-pass of the free end portion of fishline 30 behond a critical limit.

From the foregoing full description of the present invention, it has now become clear that the electrically operated tier according to the present invention can be used even by laymen in tying a length of fishline to a fishhook. This is in contrast to the art of tying the length of fishline to the fishhook which has hitherto required a sophisticated and time-consuming skill. According to the present invention, turning the length of fishline after the fishhook has been set to the machine and letting the motor work will do all that is required to form the knot for securing the length of fishline to the fishhook.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention unless they depart therefrom.

What is claimed is:

1. An electrically operated, hand-held tier for securing a fishhook to a length of fishline, which comprises, in combination:

a generally elongated, flattened housing having a bearing boss and a first guide slit means defined therein, said first guide slit means extending exteriorly of the housing and terminating at a position spaced the minimum possible distance from the longitudinal axis of the bearing boss;

a drive motor housed in the housing;

a tying wheel rotatably mounted on the bearing boss with a portion thereof exposed to the outside of the housing, said tying wheel having one annular end face formed with an annular projection protruding therefrom in coaxial relation thereto and also having a second guide slit means defined therein, said second guide slit means extending in a radial direction completely across the tying wheel, said annular projection having a detent recess defined therein;

a transmission means housed in the housing for transmitting a drive of the motor to the tying wheel to rotate the tying wheel in one predetermined direction;

an anchoring member rigidly mounted on the other annular end face of the tying wheel for rotation together therewith, said anchoring member being adapted to releaseably hold a free end portion of the length of fishline once it has been connected thereto; means secured to the bearing boss on one side laterally of said other annular end face of the tying wheel for releaseably supporting one end of the fishhook, opposite to its sharp point, in coaxial relation to the longitudinal axis of the bearing boss;

a manipulatable switching lever supported in the housing for movement between operative and inoperative positions and having a pawl element formed therein, said pawl element being, when and so long as the switching lever is in the inoperative position, engaged in the detent recess to hold the tying wheel at a stop position whereat the second guide slit means is registered with the first guide slit means in side-by-side relation to permit the passage of a portion of the fishline through both of the first and second guide slit means in a direction radially inwardly of the tying wheel so as to traverse from one side of the tying wheel to the other side thereof across and generally coaxially of the bearing boss, said anchoring member being exposed to the outside of the housing when and so long as the tying wheel is held in the stop position;

a power supply control switch operatively associated with the switching lever for, when turned on in response to the movement of the switching lever from the inoperative position to the operative position with the pawl element consequently disengaged from the detent recess, completing a power supply circuit from a source of electrical power to the drive motor to energize the latter, said switch being turned off in response to the return movement of the switching lever towards the inoperative position; and a biasing means for urging the switching lever to the inoperative position.

2. A tier as claimed in claim 1, further comprising a slider supported by the housing for movement between receiving and transfer positions along an arcuate path extending along and externally of that portion of the tying wheel exposed to the outside of the housing, said slider being, when in the receiving position, adapted to support a portion of the fishline turned therearound to extend transversely across said slider, said portion of the fishline so turned around the slider being loosened to fall into the first and second guide slit means when moved to the transfer position while the tying wheel is in the stop position, the movement of the slider from the receiving position to the transfer position being effected after the tying wheel as undergone a certain number of rotations to perform a tying operation.

3. A tier as claimed in claim 2, wherein said transmission means comprises a worm gear rigidly mounted on a drive shaft of the drive motor and gears formed integrally on the outer periphery of the tying wheel, said worm gear being meshed with the gears on the tying wheel.

4. A tier as claimed in claim 3, wherein the second guide slit means has a width substantially equal to the width of the bottom of the dale defined between each adjacent two gears on the tying wheel.

5. A tier as claimed in claim 3, further comprising means for avoiding any possible override of the worm gear relative to the gears on the tying wheel by permitting the worm gear to temporarily disengage from the gears on the tying wheel when the tying wheel being rotated is locked in the stop position with the pawl element engaged in the detent recess.

6. A tier as claimed in claim 2, wherein said switch is of a type having a movable contact and first and second fixed contacts, said power supply circuit being completed when the movable contact is engaged to the first fixed contact.

7. A tier as claimed in claim 5, wherein, when the movable contact is engaged to the second fixed contact, a braking circuit is completed between positive and negative terminals of the drive motor to apply a braking force to the drive motor.

8. A tier as claimed in claim 2, wherein said housing has first and second detent elements defining respectively the receiving and transfer positions for the slider such that the slider can be clicked into any one of the receiving and transfer positions, and further comprising means operable to permit the slider in the transfer position to incline downwards towards the first and second guide slit means then aligned with each other in side-by-side relation to facilitate the slippage of that portion of the fishline off the slider and onto the first and second guide slit means.

9. A tier as claimed in claim 2, further comprising means for retaining that portion of the fishline passing across the bearing boss from one side of the housing to the other side thereof.

10. A tier as claimed in claim 9, wherein said retaining means comprises a spring element accommodated inside a socket defined in the bearing boss in communication with the first guide slit means.

11. A tier as claimed in claim 2, wherein said anchoring member comprises a generally U-shaped resilient element having first and second leg portions continued to each other, a free end of the first leg portion being secured to the tying wheel while the second leg portion extends between the first leg portion and the other annular end face of the tying wheel and is urged to contact said other annular end face by the action of its own resiliency, said free end portion of the fishline being adapted to be gripped between the second leg portion and the tying wheel.

* * * * *